United States Patent
Rud et al.

(10) Patent No.: US 10,670,546 B2
(45) Date of Patent: Jun. 2, 2020

(54) NON-INTRUSIVE PROCESS FLUID TEMPERATURE CALCULATION SYSTEM

(71) Applicant: Rosemount Inc., Chanhassen, MN (US)

(72) Inventors: Jason H. Rud, Mayer, MN (US); Yury Nickolayevich Kuznetsov, Snezhinsk (RU); Sait Saitovich Garipov, Kopeysk (RU); Aleksey Aleksandrovich Krivonogov, Chelyabinsk (RU); Sergey Andreyevich Fomchenko, Chelyabinsk (RU); Vladimir Victorovich Repyevsky, Chelyabinsk (RU)

(73) Assignee: Rosemount Inc., Shakopee, MN (US)

(*) Notice: Subject to any disclaimer, the term of this patent is extended or adjusted under 35 U.S.C. 154(b) by 598 days.

(21) Appl. No.: 15/081,497

(22) Filed: Mar. 25, 2016

(65) Prior Publication Data
US 2017/0212065 A1    Jul. 27, 2017

Related U.S. Application Data

(63) Continuation of application No. PCT/RU2016/000020, filed on Jan. 25, 2016.

(51) Int. Cl.
*G01N 25/18* (2006.01)
*G01K 7/42* (2006.01)
*G01K 13/02* (2006.01)

(52) U.S. Cl.
CPC .............. *G01N 25/18* (2013.01); *G01K 7/427* (2013.01); *G01K 13/02* (2013.01)

(58) Field of Classification Search
CPC ........ G01N 25/18; G01K 7/427; G01K 13/02; G01K 2013/024; G01K 2013/026
See application file for complete search history.

(56) References Cited

U.S. PATENT DOCUMENTS

3,276,437 A * 10/1966  Jonakin et al. ......... F28G 15/00
                                                          122/392
3,533,273 A * 10/1970  Green .................... G01N 25/72
                                                          374/43
(Continued)

FOREIGN PATENT DOCUMENTS

| CN | 104062034 A | 9/2014 |
|---|---|---|
| EP | 908712 A1 | 4/1999 |

(Continued)

OTHER PUBLICATIONS

International Search Report and Written Opinion, from Application No. PCT/RU2016/000020, dated Oct. 27, 2016, 6 pages.

(Continued)

*Primary Examiner* — Lisa M Caputo
*Assistant Examiner* — Philip L Cotey
(74) *Attorney, Agent, or Firm* — Christopher R. Christenson; Kelly, Holt & Christenson PLLC

(57) ABSTRACT

A process fluid temperature calculation system includes a first temperature sensor disposed to measure an external temperature of a process fluid conduit. The process fluid temperature calculation system has a stem portion having a known thermal impedance. A second temperature sensor is spaced from the first temperature sensor by the stem portion. Measurement circuitry is coupled to the first and second temperature sensors. A microprocessor is coupled to the measurement circuitry to receive temperature information from the measurement circuitry and to provide an estimate of temperature of process fluid within the process fluid conduit using a heat flux calculation.

6 Claims, 6 Drawing Sheets

(56) References Cited

U.S. PATENT DOCUMENTS

| | | | |
|---|---|---|---|
| 3,724,267 A | 4/1973 | Zoschak | |
| 4,186,605 A | 2/1980 | Bourigault | |
| 4,355,908 A * | 10/1982 | Weisser | G01F 1/68 |
| | | | 374/39 |
| 4,384,793 A | 5/1983 | O'Brien | |
| 4,396,300 A * | 8/1983 | Characklis | G01N 25/18 |
| | | | 374/43 |
| 4,415,279 A * | 11/1983 | Beuse | G01K 17/08 |
| | | | 374/204 |
| 4,436,438 A | 3/1984 | Voznick | |
| 4,488,516 A | 12/1984 | Bueters | |
| 4,527,908 A | 7/1985 | Arisi | |
| 4,722,609 A * | 2/1988 | Epstein | G01K 17/20 |
| | | | 250/252.1 |
| 4,722,610 A | 2/1988 | Levert | |
| 4,826,540 A | 5/1989 | Mele | |
| 4,968,151 A * | 11/1990 | Thomson | G01K 1/143 |
| | | | 374/135 |
| 5,064,604 A | 11/1991 | Barton | |
| 5,233,868 A * | 8/1993 | Coats | G01F 1/6847 |
| | | | 73/204.18 |
| 5,743,646 A | 4/1998 | O'Connell et al. | |
| 5,980,102 A * | 11/1999 | Stulen | G01N 25/18 |
| | | | 374/138 |
| 6,367,970 B1 * | 4/2002 | Danielson | G01K 13/02 |
| | | | 374/179 |
| 6,485,174 B1 | 11/2002 | Albrecht | |
| 6,503,221 B1 | 1/2003 | Briggs et al. | |
| 6,681,625 B1 * | 1/2004 | Berkcan | G01F 1/6847 |
| | | | 73/204.15 |
| 6,824,305 B1 * | 11/2004 | Boyd | G01K 17/00 |
| | | | 374/15 |
| 6,848,373 B2 | 2/2005 | Breen | |
| 6,883,369 B1 * | 4/2005 | Myhre | G01F 1/6847 |
| | | | 73/204.12 |
| 7,220,050 B2 | 5/2007 | Esprimont | |
| 7,249,883 B2 * | 7/2007 | Kuroda | G01K 1/165 |
| | | | 374/110 |
| 7,249,885 B2 | 7/2007 | Van Den Ende | |
| 7,395,173 B2 | 7/2008 | Kautz | |
| 7,624,632 B1 * | 12/2009 | Hoyle | G01M 3/2807 |
| | | | 73/204.11 |
| 7,789,554 B2 | 9/2010 | Sattler | |
| 8,057,093 B2 * | 11/2011 | Sattler | G01K 13/002 |
| | | | 374/100 |
| 8,092,085 B2 | 1/2012 | Kawase | |
| 8,280,674 B2 | 10/2012 | Schwerer | |
| 8,591,102 B2 * | 11/2013 | Frach | G01K 17/20 |
| | | | 374/112 |
| 8,671,890 B2 * | 3/2014 | Davidson | F22B 37/565 |
| | | | 122/511 |
| 8,851,745 B2 | 10/2014 | Sakami | |
| 2004/0163969 A1 * | 8/2004 | Breen | F28D 7/0041 |
| | | | 205/725 |
| 2005/0114068 A1 * | 5/2005 | Chey | G01K 1/026 |
| | | | 702/130 |
| 2005/0217841 A1 * | 10/2005 | Van Den Ende | F28F 27/00 |
| | | | 165/287 |
| 2006/0050767 A1 | 3/2006 | Fleming | |
| 2008/0083446 A1 | 4/2008 | Chakraborty et al. | |
| 2009/0110023 A1 | 4/2009 | Clark, Jr. et al. | |
| 2010/0246630 A1 | 9/2010 | Kaszynski et al. | |
| 2010/0257871 A1 * | 10/2010 | Venkatasubramanian | |
| | | | H01L 23/38 |
| | | | 62/3.7 |
| 2010/0316086 A1 | 12/2010 | Engelstad et al. | |
| 2012/0067542 A1 * | 3/2012 | Frach | F22B 37/38 |
| | | | 165/11.1 |
| 2012/0109572 A1 * | 5/2012 | Shimizu | G01K 1/165 |
| | | | 702/131 |
| 2012/0128024 A1 | 5/2012 | Tsuchida | |
| 2014/0161151 A1 * | 6/2014 | Proctor | G01K 1/143 |
| | | | 374/147 |
| 2014/0348205 A1 * | 11/2014 | Shaw | G01M 3/002 |
| | | | 374/142 |
| 2015/0185085 A1 | 7/2015 | Converse | |
| 2017/0074730 A1 * | 3/2017 | Rieder | G01K 7/427 |
| 2017/0184456 A1 * | 6/2017 | Chatterjee | G01K 1/16 |

FOREIGN PATENT DOCUMENTS

| | | |
|---|---|---|
| FR | 2724727 A1 | 3/1996 |
| RU | 98240 U1 | 10/2010 |
| RU | 2466365 C1 | 11/2012 |
| WO | 91/14161 | 9/1991 |
| WO | 2013132239 | 9/2013 |
| WO | 2014037257 A2 | 7/2014 |
| WO | 2015135739 A1 | 9/2015 |

OTHER PUBLICATIONS

International Searching Authority, International Search Report and Written Opinion, dated Feb. 27, 2015, 10 pages.
Product Sheet, Rosemount 0085 Pipe Clamp Sensor, Emerson Process Management, Jul. 2013, 00813-0100-4952, Rev DE, pp. 1-12.
First Office Action dated Nov. 27, 2018, for Chinese Patent Application No. 201680000355.8, 17 paages Including English translation.
Office Action for Japanese Patent Application No. 2018-538684 dated Sep. 3, 2019, 10 pages with English Translation.
Extended European Search Report for European Patent Application No. 16888329.6 dated Sep. 4, 2019, 8 pages.
Russian Search Report dated Mar. 11, 2019 for Russian patent application No. 2018130672, 4 pages including English translation.
Second Australian Examination Report dated May 22, 2019 for Australian patent application No. 2016389707, 5 pages.
Canadian Office Action dated May 31, 2019 for Canadian Patent Application No. 3011963, 4 pages.
Second Office Action for Ctunese Patent Application No. 201680000355.8 dated Sep. 18, 2019, 16 pages with English translation.
Third Examination Report for Australian Patent Application No. 2016389707 dated Oct. 4, 2019, 6 pages.
Fourth Australian Examination Report dated Jan. 10, 2020 for Australian patent application No. 2016389707, 7 pages.
Third Office Acton dated Mar. 12, 2020 for Chinese Patent Application No. 201680000355.3, 16 pages including English translation.

* cited by examiner though not required, to use a non-invasive process fluid
NON-INTRUSIVE PROCESS FLUID TEMPERATURE CALCULATION SYSTEM

CROSS-REFERENCE TO RELATED APPLICATION

This Application is a continuation application filed under 35 U.S.C. 111(a) and claims benefit of International Application No. PCT/RU2016/000020, filed Jan. 25, 2016, the contents of which are hereby incorporated by reference in their entirety.

BACKGROUND

The process industry employs process variable transmitters to monitor process variables associated with substances such as solids, slurries, liquids, vapors, and gases in chemical, pulp, petroleum, pharmaceutical, food and other fluid process plants. Process variables includes pressure, temperature, flow, level, turbidity, density, concentration, chemical composition, and other properties.

A process fluid temperature transmitter provides and output related to a process fluid temperature. The temperature transmitter output can be communicated over a process control loop to a control room, or the output can be communicated to another process device such that the process can be monitored and controlled.

Traditionally, process fluid temperature transmitters were coupled to or employed thermowells which provided a temperature sensor in thermal communication with a process fluid but otherwise protected the temperature sensor from direct contact with the process fluid. The thermowell is positioned within the process fluid in order to ensure substantial thermal contact between the process fluid and the temperature sensor disposed inside the thermowell. Thermowells are typically designed using relatively robust metal structures such that the thermowell can withstand a number of challenges provided by the process fluid. Such challenges can include physical challenges, such as process fluid flowing past the thermowell at a relatively high rate; thermal challenges, such as extremely high temperature; pressure challenges, such as the process fluid being conveyed or stored at a high pressure; and chemical challenges, such as those provided by a caustic process fluid. Further, thermowells can be difficult to design into a process installation. Such thermowells require a process intrusion where the thermowell is mounted to and extends into a process vessel such as a tank or pipe. This process intrusion itself must be carefully designed and controlled such that the process fluid does not leak from the vessel at the intrusion point.

There are a number of factors that can compromise the structural integrity of a thermowell. In some cases, not all factors may be fully considered and thermowells have sometimes bent or even broken off thus causing the process installation to be shut down for a significant period of time. This is highly undesirable. For some applications, a thermowell simply cannot be used without potential damage. In such applications, it may be beneficial, or even required, to use a non-invasive process fluid temperature calculation system. With such a system, a pipe clamp sensor is used to couple a temperature sensor to a process vessel, such as a pipe. While such a non-invasive process fluid temperature calculation provides the benefit of not requiring a process intrusion, nor subjecting a thermowell directly to the process fluid, there is a tradeoff. Specifically, a non-invasive temperature calculation system is typically less accurate in detecting the process fluid temperature than a thermowell which extends into the process fluid and measures the temperature directly.

Providing a non-invasive process fluid temperature calculation system that could more accurately reflect the temperature of the process fluid would reduce some of the tradeoff required by users of such systems and also potentially provide more accurate temperature calculation and process control in situations where thermowells were not desired or possible.

SUMMARY

A process fluid temperature calculation system includes a first temperature sensor disposed to measure an external temperature of a process fluid conduit. The process fluid temperature calculation system has a stem portion having a known thermal impedance. A second temperature sensor is spaced from the first temperature sensor by the stem portion. Measurement circuitry is coupled to the first and second temperature sensors. A microprocessor is coupled to the measurement circuitry to receive temperature information from the measurement circuitry and to provide an estimate of temperature of process fluid within the process fluid conduit using a heat flux calculation.

DETAILED DESCRIPTION

Figure 1:
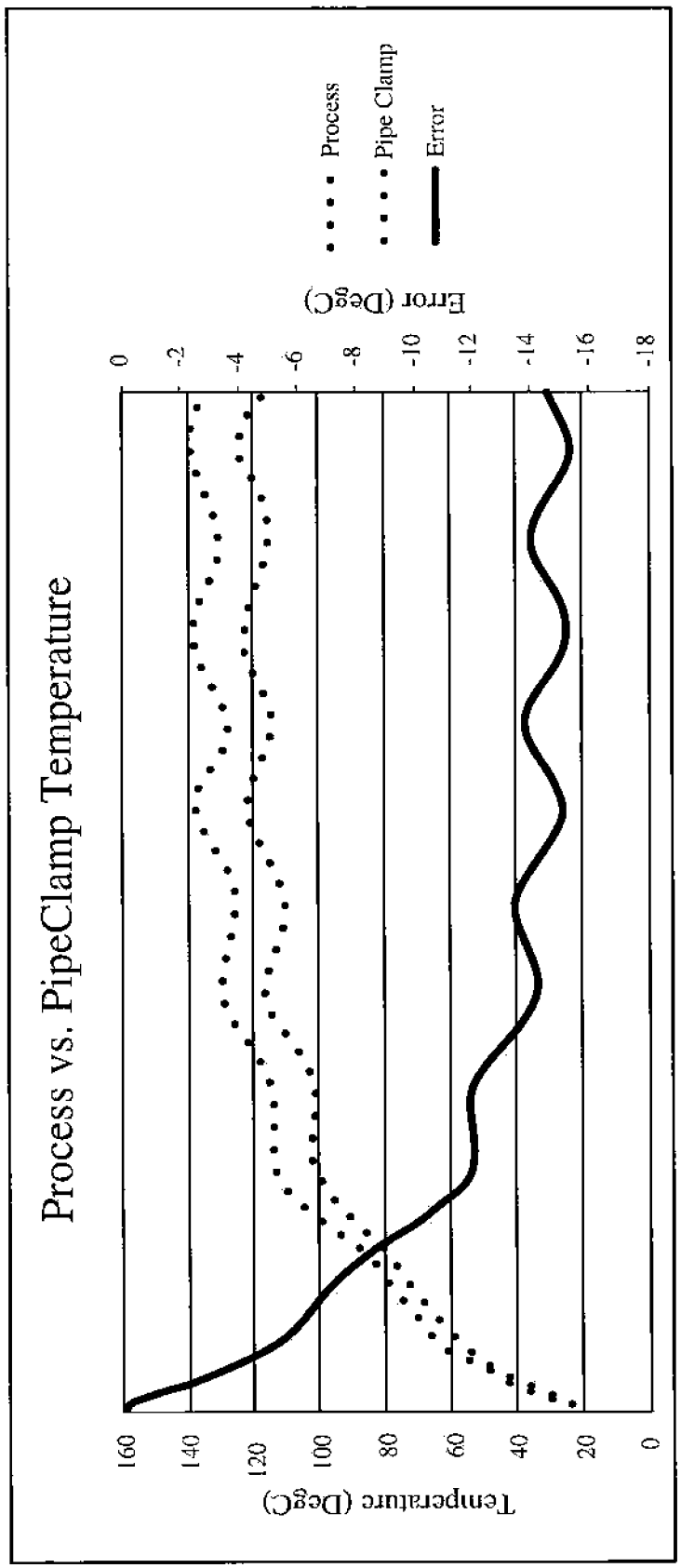
FIG. 1 is a chart of process fluid temperature versus pipe clamp temperature illustrating error associated with a non-invasive temperature calculation system.

As set forth above, selecting a non-invasive temperature calculation system has traditionally required a tradeoff in accuracy. FIG. 1 is a chart of process fluid temperature versus pipe clamp temperature illustrating error of a non-invasive temperature calculation system as the process fluid temperature changes. The left axis of the chart shows both process fluid temperature and pipe clamp temperature, while the right axis shows error in degrees Celsius. At the initial time, the process fluid temperature and pipe clamp temperature are each at approximately 25 degrees Celsius and the error is approximately zero degrees Celsius. As the process fluid temperature increases, the pipe clamp temperature also increases, but at a lesser rate. Additionally, as the process fluid temperature changes, the pipe clamp also changes, but does not quite match the process fluid temperature. This generates an error that fluctuates between approximately 14 and 16 degrees Celsius. This indicates that the pipe clamp temperature is reading approximately 14 to 16 degrees below the temperature of the process fluid.

Figure 2:
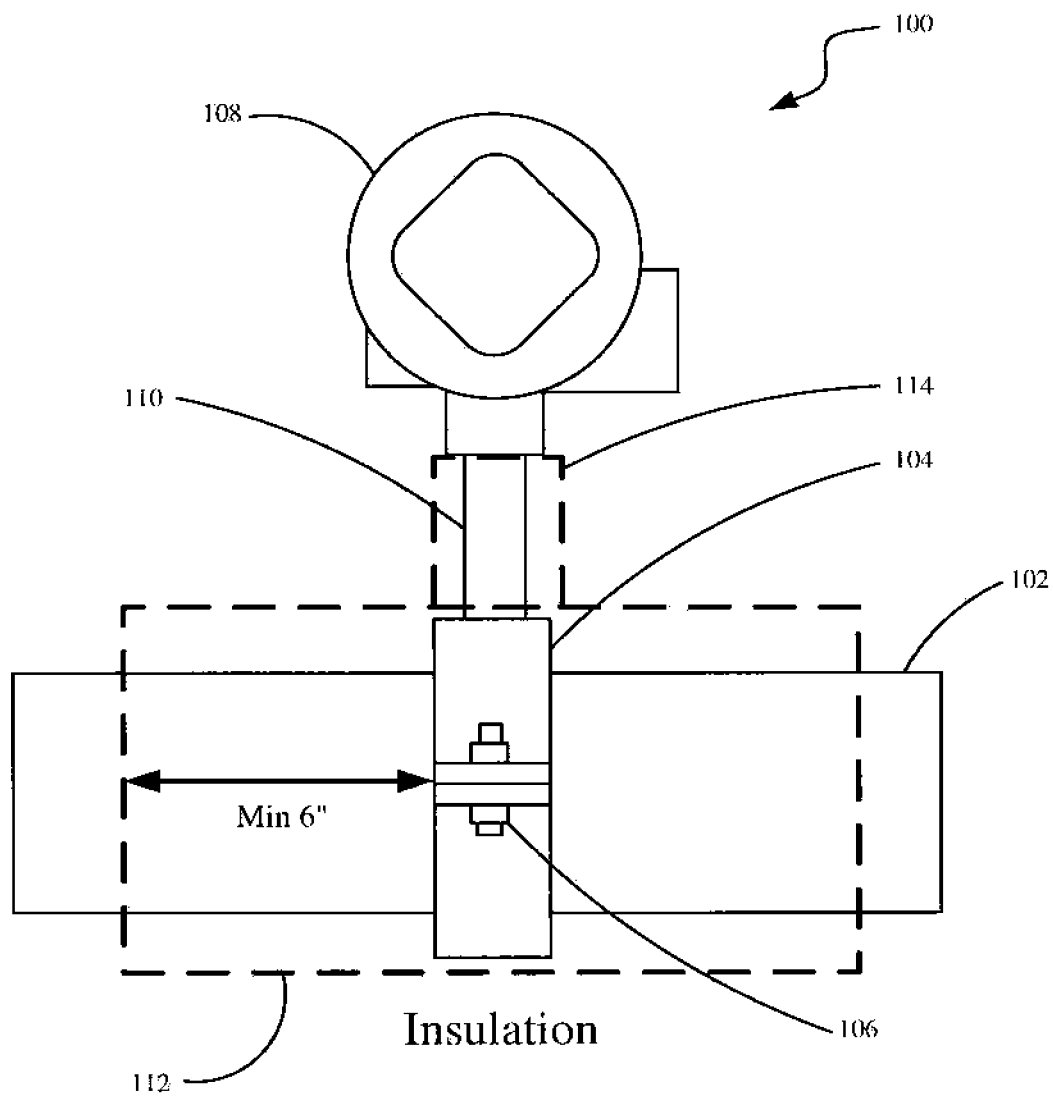
FIG. 2 is a diagrammatic view of a non-invasive temperature calculation system coupled to a process fluid vessel in accordance with one embodiment of the present invention.

FIG. 2 is a diagrammatic view of a non-invasive process fluid calculation system in accordance with an embodiment of the present invention. System 100 is illustrated as coupled to process fluid vessel 102, which, in the illustrated example, is a pipe or conduit. As such, system 100 includes a clamp 104 that secures around the outer surface of pipe 102. While the embodiment shown in FIG. 2 employs a threaded fastener to secure clamp 104 about pipe 102, any suitable clamping mechanism can be employed. Clamp 104 includes a temperature sensor (shown in FIG. 3) that is placed in direct thermal contact with the outside skin surface of pipe 102. This temperature sensor is electrically coupled to electronics disposed within housing 108 such that the electronics within housing 108 can measure the temperature of the pipe 102. System 100 also includes a stem portion 110 that couples clamp 104 to housing 108. Stem portion 110 conducts heat from clamp 104 to housing 108. However, the material selected for manufacturing stem 110; the length of stem 110; and/or the thickness of the material comprising stem 110 can be designed to provide a specific thermal impedance of stem 110. As set forth herein, thermal impedance is defined as the degree to which a structure, such as stem 110, resists heat flow. Thermal impedance may generally be thought of as the reciprocal of thermal conductance. Since some process fluid pipes 102 may be provided at relatively high temperatures, it may be beneficial for stem 110 to have a higher thermal impedance in order to protect electronics within housing 108 from such elevated temperatures.

In accordance with some embodiments of the present invention, an additional temperature sensor is provided a certain distance away from pipe 102. In one embodiment, the additional temperature sensor is disposed within housing 108. However, embodiments of the present invention can be practiced where the additional temperature sensor is provided within a fixed location inside stem portion 110. As set forth in greater detail below, sensing the skin temperature of pipe 102 and the spaced temperature from the additional temperature sensor can provide an indication of heat flow. Moreover, since environmental effects, such as wind chill and ambient temperature can affect the degree to which heat is removed from stem 110 as it flows therethrough, at least some embodiments of the present invention include thermal insulation as shown in phantom in FIG. 2. This thermal insulation can be provided about pipe 102 and clamp 104 as shown at reference numeral 112. Moreover, in one embodiment the thermal pipe insulation can extend a minimum distance in both directions (upstream and downstream) from pipe clamp 104. In one embodiment, this minimum distance is at least six inches. Additionally, thermal insulation can be provided about stem portion 110 as illustrated at reference numeral 114. For embodiments that employ insulation 112 and/or 114, the insulation should be at least ½ inch thick, and should preferably be selected to reduce or potentially eliminate any external thermal absorption. For example, ideally the outer surface of the thermal insulation would be white or reflective.

Figure 3:
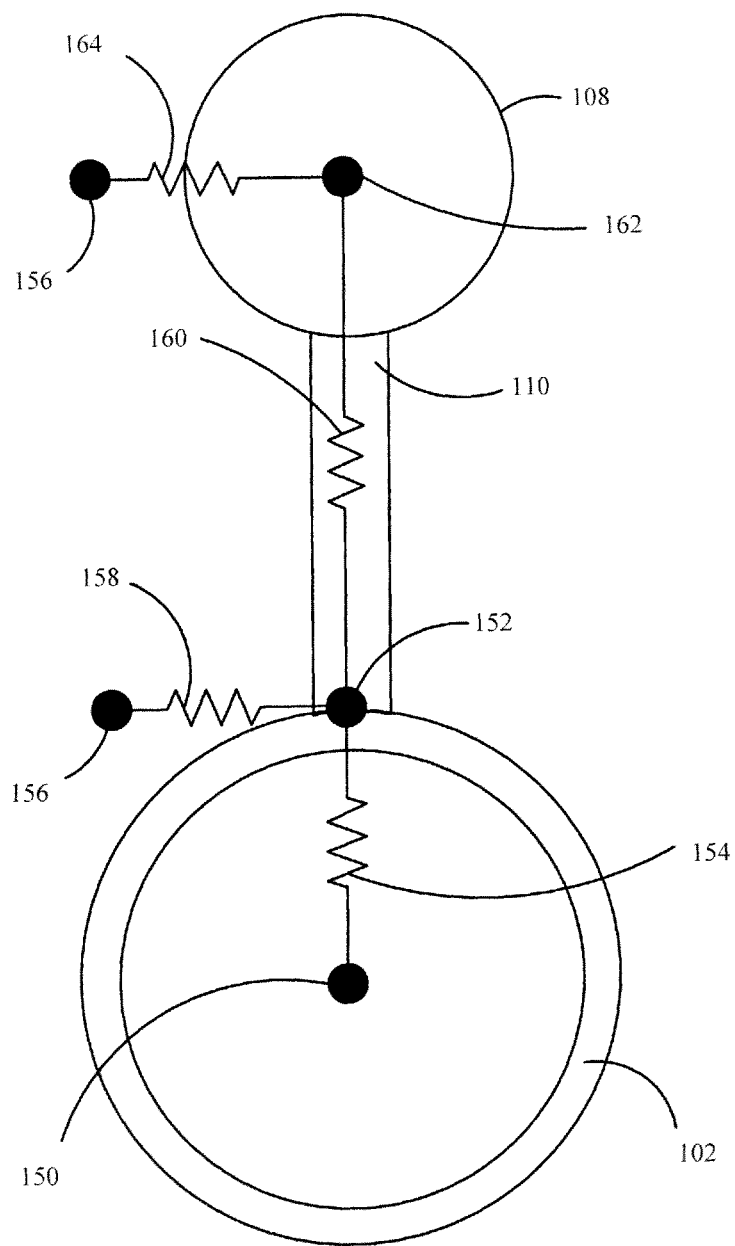
FIG. 3 is a diagrammatic view illustrating heat flow through a non-invasive process fluid temperature calculation system in accordance with an embodiment of the present invention.

FIG. 3 is a diagrammatic view of a non-invasive process fluid temperature calculation system where heat flow is modeled in terms of electrical components. Specifically, the temperature of the process fluid is illustrated as node 150 and is coupled to temperature sensor 152 via the thermal impedance of the pipe material ($R_{pipe}$) indicated diagrammatically as resistor 154. It should be noted that the thermal impedance of the pipe material can be known either by virtue of the material of the pipe itself and the thickness of the pipe wall such that a suitable impedance parameter could be entered into circuitry within housing 108. For example, a user configuring the system may indicate that the pipe is constructed from stainless steel and is ½ inch thick. Then, suitable lookup data within memory of the non-invasive process fluid temperature calculation system identifies a corresponding thermal impedance that matches the selected material and wall thickness. Moreover, embodiments may be practiced where the pipe material is simply selected and the thermal impedance can be calculated based on the selected material and the selected wall thickness. Regardless, embodiments of the present invention generally leverage knowledge of the thermal impedance of the pipe material. Further, in embodiments where the thermal impedance of the pipe material cannot be known ahead of time, it is also possible that a calibration operation can be provided where a known process fluid temperature is provided to the non-invasive process fluid temperature calculation system and the thermal impedance is set as a calibration parameter.

As indicated in FIG. 3, heat may also flow from temperature sensor 152 out the sidewall of stem portion 110 to the ambient environment illustrated at reference numeral 156 and this thermal impedance (R2) is indicated diagrammatically at reference number 158. As set forth above, the thermal impedance to ambient from the skin temperature sensor 152 can be increased by providing an insulation material, in some embodiments. Heat will flow from the external surface of pipe 102 through stem portion 110 to housing 108 via conduction through stem portion 110. The thermal impedance of stem portion 110 ($R_{sensor}$) is illustrated diagrammatically at reference numeral 160. Finally, heat may also flow from the temperature sensor 162, coupled to a terminal block within housing 108, to the ambient environment via thermal impedance 164 (R1).

When the non-invasive process fluid temperature calculation system is connected, by virtue of pipe clamp 104, to a process fluid conduit, such as pipe 102, both the skin temperature of the process fluid conduit and the transmitter terminal temperature 162 can be measured and used in a heat flux calculation to accurately infer or otherwise approximate the process fluid temperature 150 within conduit 102.

When the process fluid temperature changes, it will affect both the reading from temperature sensor 152 and the reading from terminal temperature sensor 162 since there is a rigid mechanical interconnection between them (heat conduction through stem portion 110) with relatively high thermal conductance. The same applies to the ambient temperature. When the ambient temperature changes, it will impact both of these measurements as well, but by a much lesser extent.

For slow changing conditions, the basis heat flux calculation can be simplified into:

$$T_{corrected} = T_{sensor} + (T_{sensor} - T_{terminal}) * (R_{pipe}/R_{sensor}).$$

A non-insulated clamp assembly or fast-changing process/ambient conditions can be further corrected by dynamically adjusting the $R_{sensor}$ coefficient using the rate of change in the terminal temperature versus the rate of change in the conduit skin temperature. If the conduit skin temperature is changing quickly, additional correction may be applied during this time in order to minimize time constants. Similarly, if ambient temperature is changing quickly in relation to the conduit skin temperature, less correction may be applied.

Figure 4:
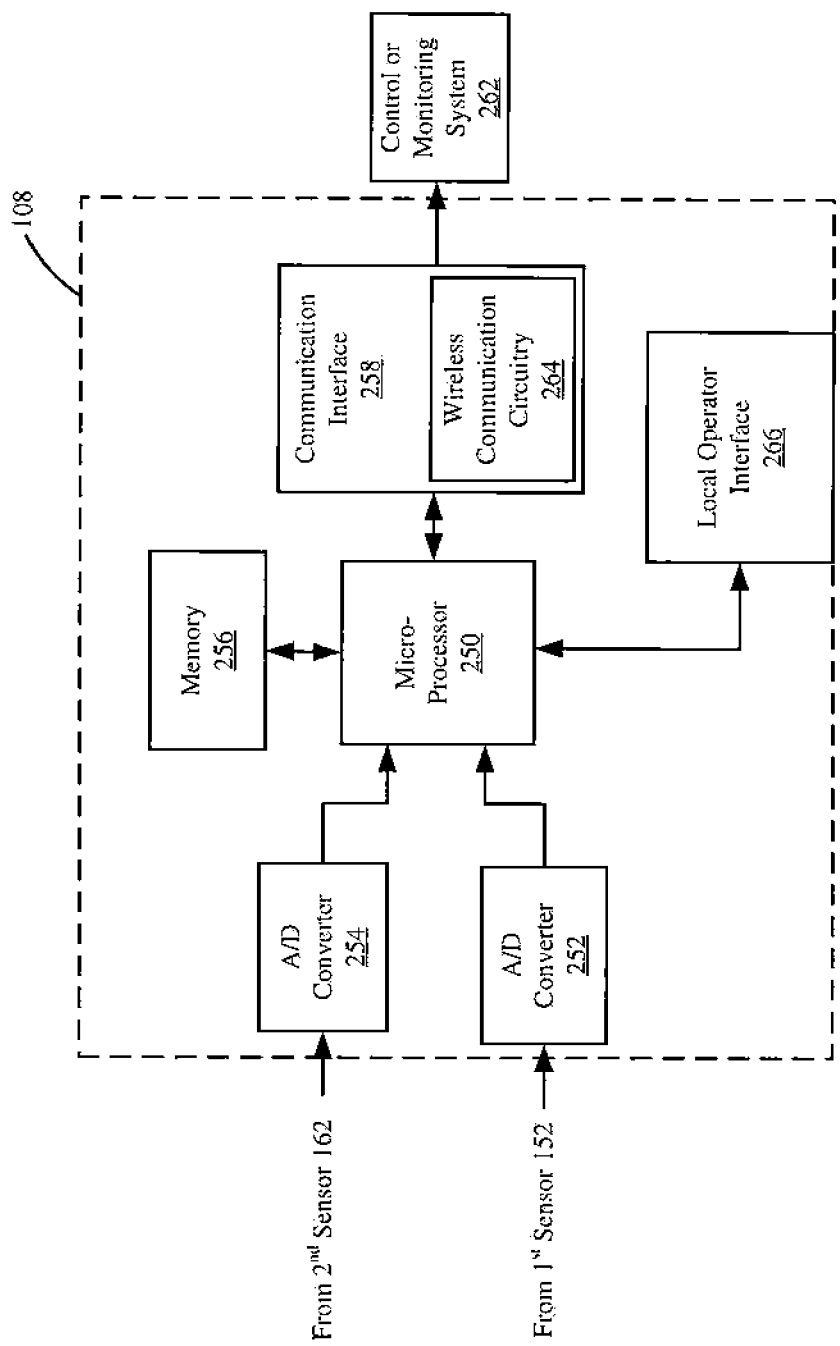
FIG. 4 is a block diagram of a non-invasive process fluid temperature calculation system in accordance with an embodiment of the present invention.

FIG. 4 is a diagrammatic view of a non-invasive process fluid temperature measurement in accordance with an embodiment of the present invention. As shown in FIG. 4, housing 108 contains microprocessor 250, first A/D converter 252, second A/D converter 254, and memory 256. First A/D converter 252 and second A/D converter 254 are analog-to-digital converters. While the example shown in FIG. 4 employs two discrete analog-to-digital converters, embodiments of the present invention can be practiced with a single analog-to-digital converter and suitable switching circuitry, such as a multiplexer, to couple the single analog-to-digital converter to multiple temperature sensors.

Microprocessor 250 is coupled to first temperature sensor 152 via first analog-to-digital converter 252. First analog-to-digital converter 252 is electrically coupled to wires of temperature sensor 152 to convert the analog electrical signals from temperature sensor 152 to a digital signal for microprocessor 250. Temperature sensor 152 and/or temperature sensor 162 can be any suitable temperature sensing device or component including a Resistance Temperature Device (RTD), a thermocouple, thermistor, or any other suitable device that has an electrical characteristic that varies with temperature. Second analog-to-digital converter 254 couples microprocessor 250 to second temperature sensor 162. Second temperature sensor 162 can also be any suitable temperature sensing device, but, in one embodiment, is the same type of temperature sensor as temperature sensor 152. Second analog-to-digital converter 254 is electrically coupled to wires of temperature sensor 162 and converts an analog electrical signal from second temperature sensor 162 to a digital signal for microprocessor 250. Together, first analog-to-digital converter 252 and second analog-to-digital converter 254 comprise measurement circuitry that couples the temperature sensors to microprocessor 250.

Memory 256 is a digital data storage device that is electrically coupled to microprocessor 250. Memory 256 contains data, as well as parameters such as thermal impedance information with respect to the pipe material and the stem portion. The thermal impedance of the stem portion will be determined during the manufacture of the system and thus can be entered during manufacture. The thermal impedance of the pipe material can be selected during commissioning of the system, or can otherwise be empirically determined during a calibration or other suitable process. Regardless, memory 256 contains parameters that allow microprocessor 250 to estimate process fluid temperature information from the signals obtained from temperature sensors 152 and 162.

Process vessel wall parameters, stored within memory 256, can include physical characteristics of the process vessel wall such as $K_w$ of the process vessel wall as well as the process vessel wall thickness. Process vessel wall parameters may be stored in memory 256 when the temperature measurement assembly is manufactured. However, as set forth above, these parameters may be determined during configuration or commissioning of the assembly or during a calibration process.

According to Fourier's Conduction Law, heat flux through stem portion 110 should be the same as through the wall of process vessel 102. Under this condition, the temperature of the internal surface of the process vessel wall (and also the process fluid temperature) may be determined from the signal obtained from temperature sensor 152 and the signal obtained from terminal temperature sensor 162.

In the embodiment shown in FIG. 4, housing 108 may also include communication interface 258. Communication interface 258 provides communication between the temperature measurement assembly and control or monitoring system 262. So equipped, the temperature measurement system may also be referred to as a temperature measurement transmitter and may transmit the temperature of the process fluid to control or monitoring system 252. Communication between the temperature measurement system and control or monitoring system 262 can be through any suitable wireless or hard-wired connection. For example, communication may be represented by an analog current over a two-wire loop that ranges from 4-20 mA. Alternatively, the communication may be transmitted in a digital form over a two-wire loop using the Highway Addressable Remote Transducer (HART®) digital protocol, or over a communication bus using a digital protocol such as FOUNDATION' Fieldbus. Communication interface 258 may optionally or alternatively include wireless communication circuitry 264 for communication by wireless transmission using a wireless process communication protocol such as WirelessHART in accordance with IEC 62591. Moreover, communication with control or monitoring system 262 can be direct or through a network of any number of intermediate devices, for example, a wireless mesh network (not shown).

Communication interface 258 can help manage and control communication to and from the temperature measurement system. For example, control or monitoring system 262 may provide for configuration of the temperature measurement system, including entering or selecting any suitable number of parameters relative to thermal impedance of the process vessel wall, etc.

The example shown in FIG. 4 may also include local operator interface 266. Local operator interface 266 can be provided to display the estimated temperature of the process fluid, as well as the measured temperature of the external surface provided directly by temperature sensor 152. Additionally, local operator interface may provide an indication of the terminal temperature measured by temperature sensor 162. Further still, ambient temperature measurement can also be provided using an additional temperature sensor and such measurement can optionally be indicated by local operator interface 266. Local operator interface 266 may include any suitable number of buttons or keypad that allow a user to interact with the non-invasive temperature measurement system. Such interaction can include entering or selecting the material of the process fluid conduit as well as the thickness of the process fluid conduit wall.

Figure 5:
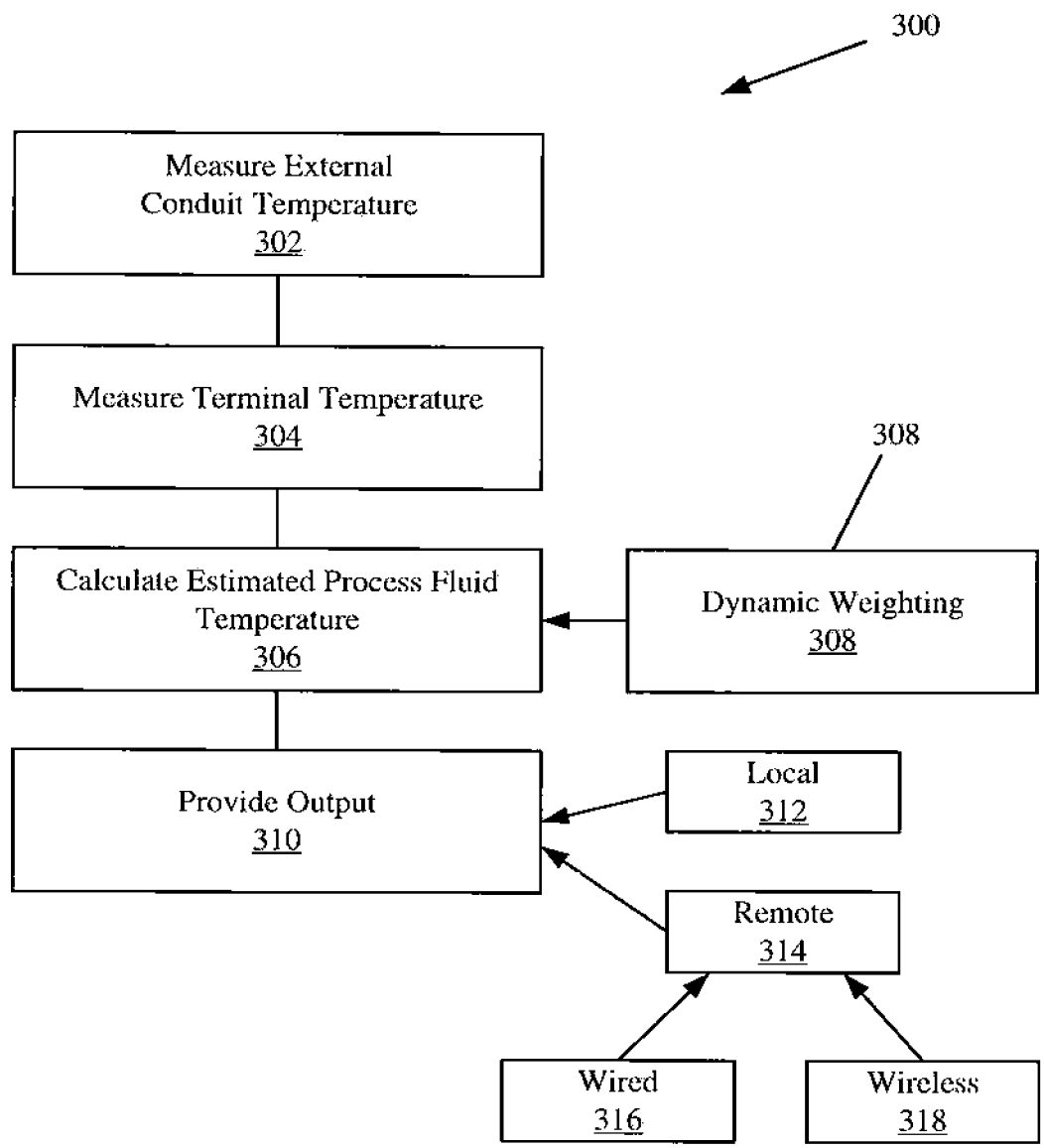
FIG. 5 is a flow diagram of a method of estimating process fluid temperature in a non-invasive temperature measurement system in accordance with an embodiment of the present invention.

FIG. 5 is a flow diagram of a method of inferring process fluid temperature in accordance with an embodiment of the present invention. Method 300 begins at block 302 where an external temperature of a process fluid conduit is measured. As set forth above, this external temperature is preferably measured using a temperature sensor positioned directly against the outside diameter or surface of the process fluid conduit. Next, at block 304, a terminal temperature within a housing of a non-invasive process fluid temperature calculation system is measured. While embodiments described herein generally refer to the measurement of the transmitter terminal temperature, embodiments of the present invention can be practiced by measuring the temperature of the housing itself, or any other suitable structure within the housing. Next, at block 306, the measured external conduit temperature and measured terminal temperatures are provided to a processing facility, such as a microprocessor 250 disposed within housing 108, such that the temperature of the process fluid can be inferred using a basic heat flux calculation, such as that set forth above. While embodiments described thus far have generally focused upon a processor, such as microprocessor 250, providing a calculation within housing 108, it is expressly contemplated that embodiments described herein can also be practiced by providing the raw temperature measurements from the external conduit temperature sensor and the terminal temperature sensor to a remote facility or processor that can estimate the process fluid temperature. Regardless, the basic heat flux calculation generally provides an estimate of the process fluid temperature using the values from external conduit temperature sensor and the terminal temperature sensor. As set forth above, dynamic weighting 308 can be applied in accordance with some embodiments of the present invention such that rapidly changing conditions can be dynamically adjusted. For example, in one embodiment, a fast changing process fluid temperature condition can be further corrected by dynamically adjusting the thermal impedance of the sensor assembly parameters stored within memory 256 by the rate of change in the terminal temperature measurement versus the rate of change in the skin temperature measurement (provided by temperature sensor 152). If the skin temperature measurement is changing quickly, additionally correction may be applied during the time of quickly changing temperature in order to minimize error due to time constants. Similarly, if ambient temperature is changing quickly in relation to skin temperature, less correction may be applied.

Next, at block 310, the inferred process fluid temperature is provided as an output by the non-invasive process fluid temperature measurement system. This output can be provided as a local output via a local operator interface, as indicated at block 312, and/or the output can be provided to a remote device as indicated at block 314. Moreover, as indicated at block 316, the provision of the output to a remove device can be via a wired process communication coupling as indicated at block 316 and/or it may be provided wirelessly as indicated at block 318.

Figure 6A:
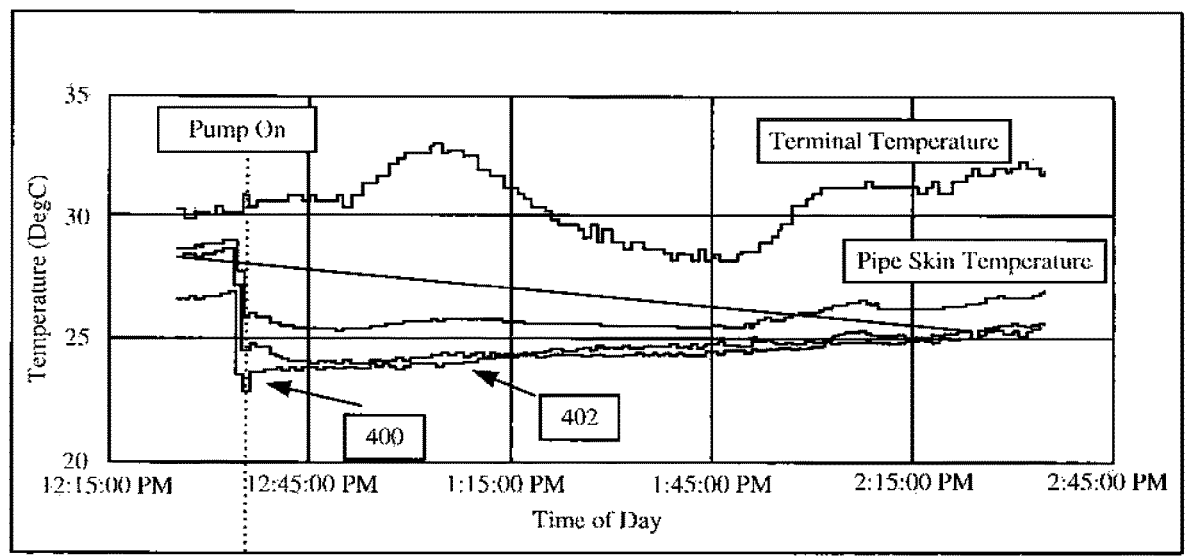
FIGS. 6A and 6B are charts illustrating corrected temperature and compensation error, respectively, of a non-invasive process fluid temperature calculation system in accordance with an embodiment of the present invention.
Figure 6B:
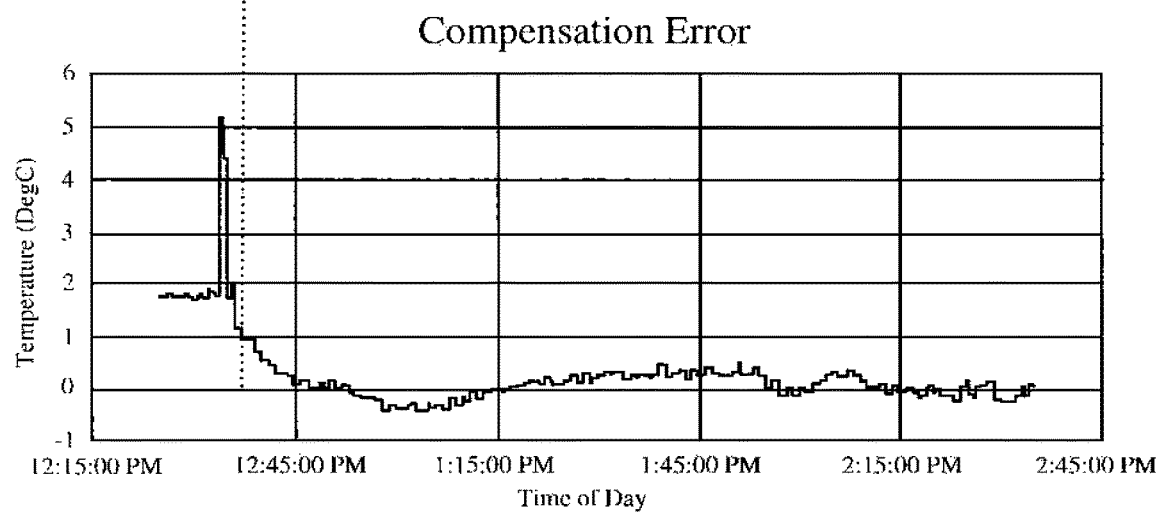

FIGS. 6A and 6B are charts illustrating results of non-invasive process fluid temperature estimation using heat flux calculations in accordance with embodiments of the present invention. As shown in FIG. 6A, the pipe skin temperature fluctuates to a relatively small extent during a time interval from approximately 12:40 PM to 2:45 PM. In that same time interval, the terminal temperature fluctuates between approximately 27 degrees Celsius and approximately 33 degrees Celsius. The process temperature is illustrated at reference numeral 400 and is tracked very closely by the corrected temperature output 402. The compensation error is directly indicated in FIG. 6B. As shown, embodiments of the present invention provide a non-invasive process fluid temperature calculation or estimation system that is able to accurately to reflect the temperature of the process fluid flowing within a process fluid conduit, such as a pipe, without requiring an intrusion into the process fluid conduit itself. Accordingly, process control may be improved using the heat flux-based temperature calculation techniques described herein.

Although the present invention has been described with reference to preferred embodiments, workers skilled in the art will recognize that changes may be made in form and detail without departing from the spirit and scope of the invention.

What is claimed is:

1. A process fluid temperature calculation system comprising:
    a housing;
    a conduit temperature sensor in direct contact with a surface of a process fluid conduit, configured to measure an external temperature of the process fluid conduit;
    a reference temperature sensor coupled to a terminal block within the housing and configured to provide a reference temperature measurement;
    measurement circuitry coupled to the conduit temperature sensor and the reference temperature sensor; and
    a microprocessor disposed within the housing and configured to obtain the reference temperature measurement having a fixed thermal relationship relative to the conduit temperature sensor, the reference temperature measurement being different than the measured external temperature of the process fluid conduit, the microprocessor being coupled to the measurement circuitry to receive information from the measurement circuitry indicative of a signal from the conduit temperature sensor and the reference temperature sensor and to calculate a process fluid temperature estimation output using a heat transfer calculation with a difference between the conduit temperature sensor signal and the reference temperature sensor signal.

2. The process fluid temperature calculation system of claim 1, wherein the fixed thermal relationship relative to the sensor is a thermal impedance.

3. The process fluid temperature calculation system of claim 2, wherein the thermal impedance is set as a calibration parameter of the process fluid temperature calculation system.

4. A method of calculating an estimate of a temperature of process fluid within a process fluid conduit, the method comprising:
    measuring a skin temperature of an external surface of the process fluid conduit;
    obtaining reference temperature information relative to a location of a terminal block inside a housing of a process fluid temperature calculation system;
    using a heat transfer equation with the skin temperature and the reference temperature information to calculate heat transfer; and
    using the calculated heat transfer in combination with a thermal impedance parameter relating heat flow between the external surface of the process conduit and the location of a terminal block inside a housing of a process fluid temperature calculation system to calculate the estimate of the temperature of the process fluid; and
    providing the calculated temperature estimate as an output.

5. The method of claim 4, wherein the reference temperature information is obtained using a reference temperature sensor.

6. The method of claim 4, wherein the thermal impedance parameter is determined during a calibration operation.

* * * * *

UNITED STATES PATENT AND TRADEMARK OFFICE
CERTIFICATE OF CORRECTION

| | |
|---|---|
| PATENT NO. | : 10,670,546 B2 |
| APPLICATION NO. | : 15/081497 |
| DATED | : June 2, 2020 |
| INVENTOR(S) | : Jason H. Rud et al. |

It is certified that error appears in the above-identified patent and that said Letters Patent is hereby corrected as shown below:

On the Title Page

Page 2, Other Publications, Line 19, delete "Ctunese" and insert --Chinese--

Page 2, Other Publications, Line 27, delete "201680000355.3" and insert --201680000355.8--

Signed and Sealed this
Twenty-fifth Day of October, 2022

Katherine Kelly Vidal
*Director of the United States Patent and Trademark Office*